Sept. 12, 1933.     C. M. AMBLER, JR     1,926,188
OIL PURIFICATION
Filed Oct. 22, 1929
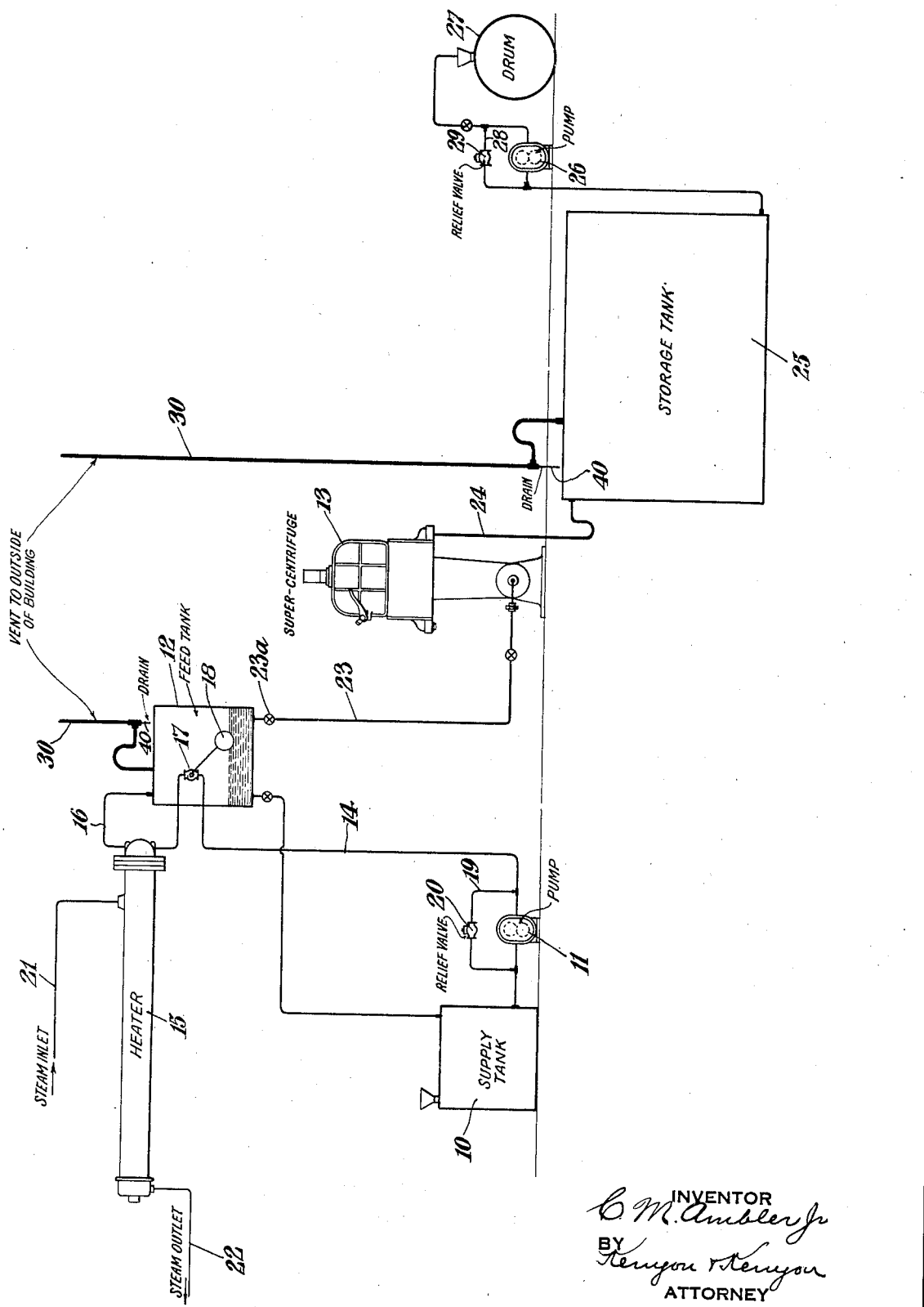
INVENTOR
C. M. Ambler Jr
BY
Kenyon & Kenyon
ATTORNEY Patented Sept. 12, 1933

1,926,188

UNITED STATES PATENT OFFICE 1,926,188

OIL PURIFICATION

Charles M. Ambler, Jr., Philadelphia, Pa., assignor to The Sharples Specialty Company, Philadelphia, Pa., a corporation of Delaware Application October 22, 1929. Serial No. 401,421

2 Claims. (Cl. 196—16)

This invention relates to the purification of used lubricating oil and particularly to the purification of such oil having relatively high viscosity.

Used lubricating oil, to the purification of which this invention is directed, is of relatively high viscosity e. g. a viscosity of the order of 60 seconds Universal Saybolt viscosity at 210° F., and contains water of which some part may be emulsified with the oil, products of decomposition including carbon and also sludge of which some part may be soluble in the oil at relatively high temperatures, and other finely divided solids including eroded bearing materials, dirt, metal particles, and fibrous material. Oil that has been used for the lubrication of axle journals of street cars and of rolling stock of railroads, herein called car journal oil, is a conspicuous example of such oil. The car journal oil that is purified in the practice of this invention is oil that has been separated from the cotton or wool waste that is saturated by it, in any well known manner such as pressing or centrifugal draining, prior to treatment of the oil in accordance with this invention.

The purification of oils of the type purified in the practice of this invention, has presented a difficult problem in view of the extent to which it must be purified and the difficulty of removing impurities from oil of such type. For example, the American Railway Association requires that used car journal oil must be purified to such an extent prior to re-use that centrifugal treatment of a benzol solution of the oil at 1600 R. P. M. will show that the purified oil contains less than one half of one per cent of solids and water. As a result complicated and expensive procedures such as are used in the refining of crude petroleum, including acid treatment, distillation, etc., have been proposed but they lack commercial practicability.

It is an object of this invention to provide a simple and practicable process for the purification of such oil. Accordingly, a feature of this invention is that troublesome and expensive operations heretofore proposed are dispensed with and simple heating and centrifuging are employed although such simple steps have heretofore proved inadequate as heretofore applied.

Although the difficulties encountered in the purification of oil of the type purified in the practice of this invention led to the development of complicated and expensive processes in an effort to solve the problem of purifying such oil, I have found that such oil can be purified to a desirable extent by heating the oil and subjecting it to high centrifugal force while it is hot provided the oil is heated, prior to such centrifugal treatment thereof, to a temperature above the boiling point of water and even as high as 350° F., or slightly higher.

I do not attempt to explain the reasons why the use of such high temperatures solves the difficulty of purifying such oil centrifugally, but it is my present belief that such heating prior to treatment with high centrifugal force breaks down the contained emulsion to such an extent and removes dispersed particles of water to such an extent that oil-water interfaces at which solids may be adsorbed are eliminated and removal of solids from the viscous oil by centrifugal force is thereby facilitated.

In the drawing, in which there is diagrammatically shown apparatus suitable for the practice of my process, used oil of the type above referred to is introduced into supply tank 10 and is passed therefrom by pump 11 to feed tank 12, at a rate dependent upon the level of liquid in tank 12; and heated oil from tank 12 is passed to centrifuge 13. To this end discharge pipe 14 of pump 11 passes through tank 12 and then to heater 15 from which hot oil pipe 16 leads to tank 12. In that part of pipe 14, which is within tank 12, there is a valve 17 that is controlled by float 18 in tank 12. As a result, oil will pass from pipe 14 through heater 15 and pipe 16 into tank 12, only when the liquid in tank 12 falls below a predetermined level. When valve 17 is closed by float 18 oil will flow from the discharge side of pump 11 to the inlet side of pump 11 by means of a by-pass 19 containing a relief valve 20, thus avoiding overloading of any motor employed to operate pump 11. Preferably heater 15 is of the nature of a pipe still in order that explosive ebullition and foaming will be avoided in the heating of the water-containing oil; but it may be of any suitable construction, being provided with a steam inlet 21 and a steam outlet 22 in the construction shown, so long as it supplies to the oil sufficient heat to evaporate the water therein and raise the temperature thereof to a temperature above the boiling point of water and preferably of the order of 300° F. Centrifuge 13 may be of any suitable construction so long as it is capable of subjecting the hot impure oil to high centrifugal force; and hot oil flows to centrifuge 13 by gravity through pipe 23 under control of valve 24. If impure viscous oils containing water, of which an example is used car journal oil which contains asphalt and soap and other impurities which reduce its surface tension and which has Universal Saybolt viscosity in the neighborhood of 600 seconds at 100° F., are brought to a heated state by heating a batch of such oil to a temperature at which water evaporates under the existing pressure, the oil is converted to a foam which occupies many times the volume of the original oil (three per cent of water by volume giving a foam occupying about fifty times the volume of the original oil) which is stable for hours and not capable of being centrifugally clarified. But, when such oils are heated while being passed through a pipe, in accordance with this invention, only a relatively small volume of water-containing oil is brought to the foam-forming temperature, and such oil as is brought to that temperature is quickly brought to a temperature that will cause the foam to break, e. g., temperatures between 250° F. and 350° F., whereas there is no way to raise such a foam-breaking temperature oil that has been converted to foam by heating a batch of the oil.

Inasmuch as water is eliminated from the oil prior to the introduction of the oil into a centrifuge, the centrifuge is operated as a clarifier in that only centrifuged oil is discharged therefrom while solid particles removed from the oil by centrifugal sedimentation are retained in the centrifugal rotor. It has been found that in the purification of used car journal oil the absence of water from the oil introduced to the centrifuge makes it possible to run the centrifuge for periods of approximately fifteen minutes or longer before cleaning of the rotor is necessary; and then the centrifuge is stopped and a clean centrifugal bowl is substituted during the cleaning of the previously used centrifugal bowl. Oil passes from centrifuge 13 through pipe 24 to storage tank 25. The oil may be cooled in any suitable manner as by allowing it to stand in tank 25 until it is sufficiently cool; and then it may be passed by means of pump 26 to suitable containers 27, pump 26 being provided with a by-pass 28 containing relief valve 29. To the end that undesirable discharge of vapors into the operating room may be avoided the system is substantially enclosed and to this end the centrifugal machine employed may be of the type shown in Jones & Ayres Patent No. 1,575,061 granted March 2nd, 1926; and tanks 12 and 25 may be respectively provided with vent pipes 30 provided with drains 40 that lead to any suitable point.

It has been found that in the practice of this invention oil of the type herein referred to, and particularly car journal oil, cannot be satisfactorily purified at temperatures below 212° F., and that such oils can be satisfactorily purified by the application of high centrifugal force, as in a rotor approximately thirty inches long and four and one half inches in diameter and rotating at 15,000 R. P. M., provided the oil is preliminarily heated to temperatures above 212° F. and preferably in the neighborhood of 340° F.

I claim:

1. In the purification of used car journal oil containing water, products of decomposition including carbon, and other finely divided solids including bearing material and dirt, the steps comprising heating said used car journal oil containing water while said oil is flowing in a pipe to a temperature at which the water will be vaporized and at which foam produced by the resulting vapors will break, permitting resulting vapors to escape from the oil, and subjecting the previously heated oil to centrifugal treatment while hot and thereby removing solids from the oil.

2. In the purification of used car journal oil containing water, products of decomposition including carbon, and other finely divided solids including bearing material and dirt, the steps comprising flowing said used car journal oil containing water through a pipe and heating it while therein to a temperature between approximately 250° F. and 350° F., and subjecting the previously heated oil to centrifugal treatment while hot and thereby removing solids therefrom.

C. M. AMBLER, JR.